(12) United States Patent
Garrison et al.

(10) Patent No.: US 8,616,174 B2
(45) Date of Patent: Dec. 31, 2013

(54) MOTORCYCLE ENGINE CASE WITH ADJUSTABLE OIL SCRAPER AND METHOD OF USING THE SAME

(75) Inventors: John M. Garrison, Arnold, MO (US); Brian D. Brace, Columbia, IL (US)

(73) Assignee: Midwest Motorcycle Supply Distributors Corp., Pevely, MO (US)

(*) Notice: Subject to any disclaimer, the term of this patent is extended or adjusted under 35 U.S.C. 154(b) by 270 days.

(21) Appl. No.: 13/049,641

(22) Filed: Mar. 16, 2011

(65) Prior Publication Data

US 2012/0234288 A1 Sep. 20, 2012

(51) Int. Cl.
*F01M 11/02* (2006.01)
(52) U.S. Cl.
USPC .................................. 123/196 R; 123/196 CP
(58) Field of Classification Search
USPC .............................. 123/196 R, 196 CP, 196 A
See application file for complete search history.

(56) References Cited

U.S. PATENT DOCUMENTS

| | | | | |
|---|---|---|---|---|
| 2,165,909 A | * | 7/1939 | Spiller | 184/6.13 |
| 6,454,622 B2 | * | 9/2002 | Mashiko et al. | 440/89 R |
| 6,945,216 B2 | * | 9/2005 | Trease | 123/196 R |
| 7,137,376 B2 | * | 11/2006 | Ito | 123/196 R |
| 7,163,006 B2 | * | 1/2007 | Sharman | 123/572 |

* cited by examiner

*Primary Examiner* — Noah Kamen
*Assistant Examiner* — Long T Tran
(74) *Attorney, Agent, or Firm* — Thompson Coburn LLP

(57) ABSTRACT

A motorcycle engine case comprises crankshaft support portions that are configured and adapted to support a crankshaft in a manner such that the crankshaft is rotatable about a crankshaft axis relative to the engine case. The engine case also comprises an internal cavity that is configured and adapted to house at least one flywheel in a manner such that the flywheel is rotatable about the crankshaft axis with the crankshaft relative to the engine case. The engine case further comprises an adjustable oil scraper that is movable toward and away from the crankshaft axis and that can be locked in position relative to the crankshaft axis. The oil scraper is adapted and configured to remove oil clinging to the flywheel as the flywheel rotates about the crankshaft axis.

12 Claims, 6 Drawing Sheets

{#_}
MOTORCYCLE ENGINE CASE WITH ADJUSTABLE OIL SCRAPER AND METHOD OF USING THE SAME

CROSS-REFERENCE TO RELATED APPLICATIONS

Not Applicable

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention pertains to internal combustion motorcycle engines. More specifically, this in invention pertains to a motorcycle engine case that comprises an adjustable oil scraper that allows the engine case to accommodate a range of flywheel dimensions.

2. General Background

Motorcycle engines often comprise one or more flywheels that are located within the engine case and that are rotational fixed to the crankshaft. Such a flywheel typically comprises a cylindrical or a partial cylindrical outer surface that is aligned with the crankshaft axis. The engine case typically comprises a stationary oil scraper that has a scraping edge that is positioned very close to the cylindrical outer surface of the flywheel. As the flywheel rotates within the engine case, the oil scraper engages oil that clings to the cylindrical outer surface of the flywheel and removes such oil from the flywheel. The oil removed from the flywheel by the scraper is then channeled to the oil pump.

In some situations, motorcycle owners desire replacing one flywheel with another smaller or larger flywheel. For example, by replacing standard OEM flywheels with slightly smaller flywheels, engine acceleration can be improved due to the corresponding reduction in the rotational moment of inertia of the flywheels. Of course, the reduction of the rotational moment of inertia results in less even torque between the power strokes of the engine, and is therefore not always desired. Additionally, the oil scraper of the OEM engine case is fixed in position and is therefore adapted and configured to function properly only in combination with a specific flywheel diameter. Thus, the oil scraper of the OEM engine case would not function properly with a flywheel that is smaller than the OEM flywheel and would prevent a larger flywheel from being utilized. For this reason, motorcycle owners that wish to use non-OEM sized flywheels typically must replace the OEM engine case with one that is specifically adapted for the alternatively sized flywheel.

SUMMARY OF THE INVENTION

The present invention eliminates some of the problems associated with replacing OEM motorcycle flywheels with non-OEM sized flywheels. A motorcycle engine case in accordance with the present invention comprises an adjustable oil scraper that is configured and adapted to function properly in combination with a range of flywheel sizes.

In one aspect of the invention, a motorcycle engine case comprises crankshaft support portions that are configured and adapted to support a crankshaft in a manner such that the crankshaft is rotatable about a crankshaft axis relative to the engine case. The engine case also comprises an internal cavity that is configured and adapted to house at least one flywheel in a manner such that the flywheel is rotatable about the crankshaft axis with the crankshaft relative to the engine case. The engine case further comprises an adjustable oil scraper that is movable toward and away from the crankshaft axis and that can be locked in position relative to the crankshaft axis. The oil scraper is adapted and configured to remove oil clinging to the flywheel as the flywheel rotates about the crankshaft axis.

In another aspect of the invention, a method comprises removing a first flywheel from a motorcycle engine case. The engine case comprises an adjustable oil scraper that is configured and adapted to remove oil clinging to the first flywheel as the first flywheel rotates about a crankshaft axis. The first flywheel has a largest cross-sectional dimension. The method also comprises a step of installing a second flywheel in the motorcycle engine case. The second flywheel has a largest cross-sectional dimension. The largest cross-sectional dimension of the first flywheel is different from the largest cross-sectional dimension of the second flywheel. The method further comprises a step of adjusting the position of the oil scraper relative to the crankshaft axis in a manner accounting for the difference between the largest cross-sectional dimension of the first flywheel and the largest cross-sectional dimension of the second flywheel.

Further features and advantages of the present invention, as well as the operation of the invention, are described in detail below with reference to the accompanying drawings.

Figure 1:
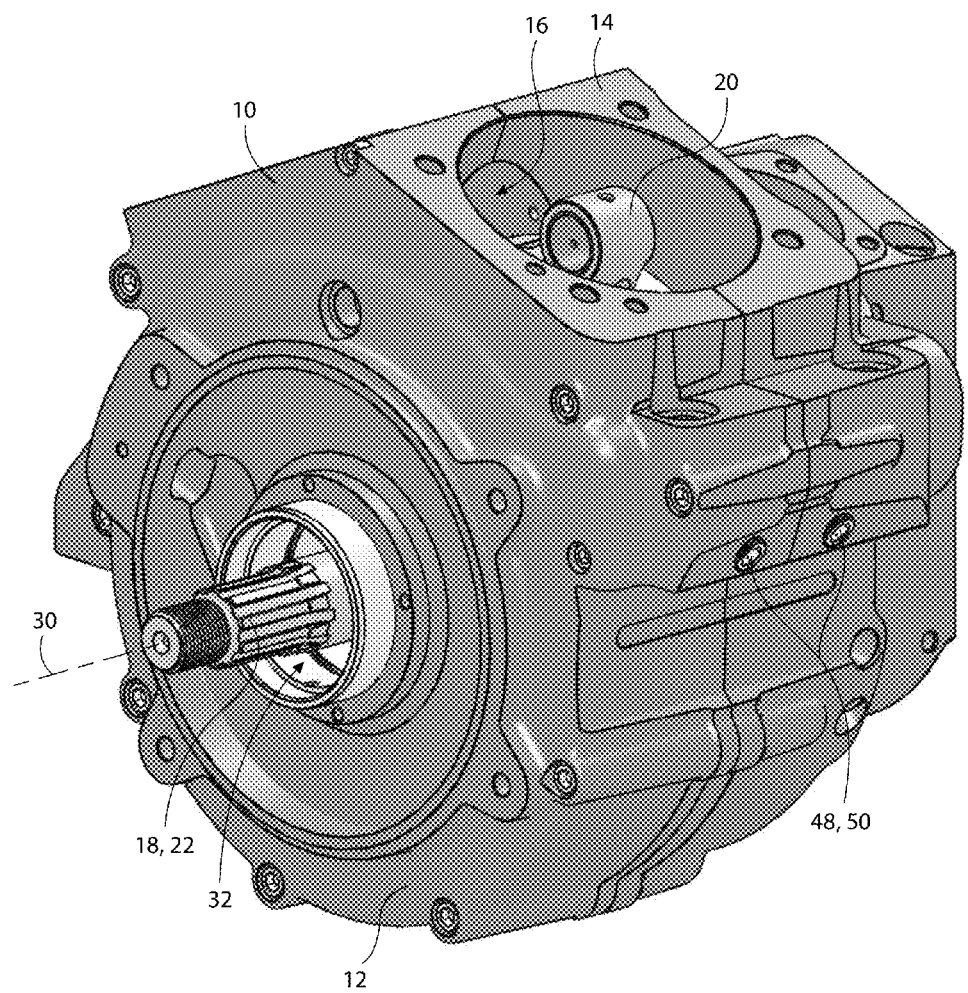
FIG. 1 depicts a perspective view of a portion of a motorcycle engine that comprises an embodiment of an engine case in accordance with the invention.

Reference numerals in the written specification and in the drawing figures indicate corresponding items.

DETAILED DESCRIPTION

An embodiment of a motorcycle engine case 10 in accordance with the invention, along with some other engine components, is shown in FIG. 1. The engine case 10 is made up of a first half 12 and a second half 14 that, when joined as shown, collectively form an internal cavity 16 that houses the majority of the crankshaft 18 and connecting rods 20.

Figure 6:
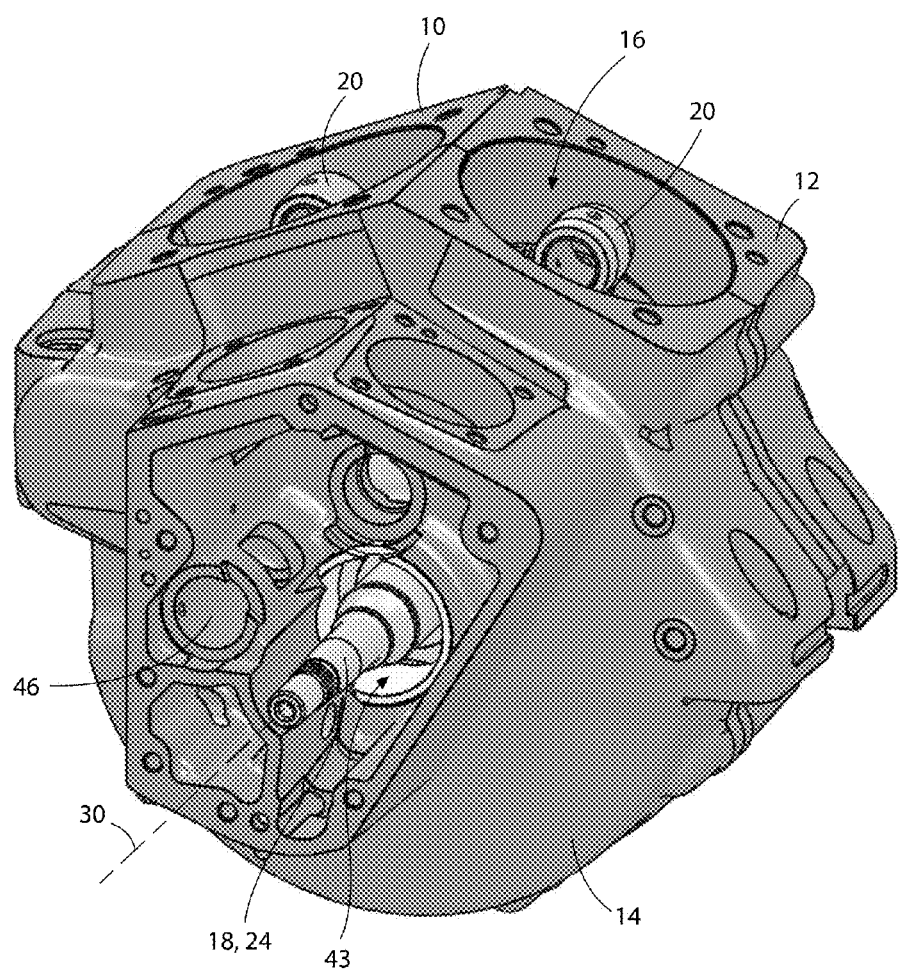
FIG. 6 depicts a rear perspective view of the engine portion shown in FIG. 1.

The crankshaft 18 comprises a sprocket shaft 22, a pinion shaft 24 (shown in FIG. 6), a crankpin 26, and a pair of flywheels 28. The sprocket shaft 22 and the pinion shaft 24 are axial aligned with each other and define the crankshaft axis 30 about which the crankshaft 18 rotates relative to the first and second halves (12 and 14 respectively) of the engine case 10. The sprocket shaft 22 is configured to transmit torque to the transmission and is fixedly (but also removably) connected to one of the flywheels 28. The pinion shaft 24 is directly connected to the other of the flywheels 28 and is configured to provide power take-off for powering other components, such as the oil pump and cam(s) (not shown). The flywheels 28 are fixedly linked to each other via the crankpin 26, which is offset from the crankshaft axis 30. The connecting rods are pivotally connected to the crankshaft 18 via the crankpin 26. All these components can be disassembled from each other.

Figure 2:
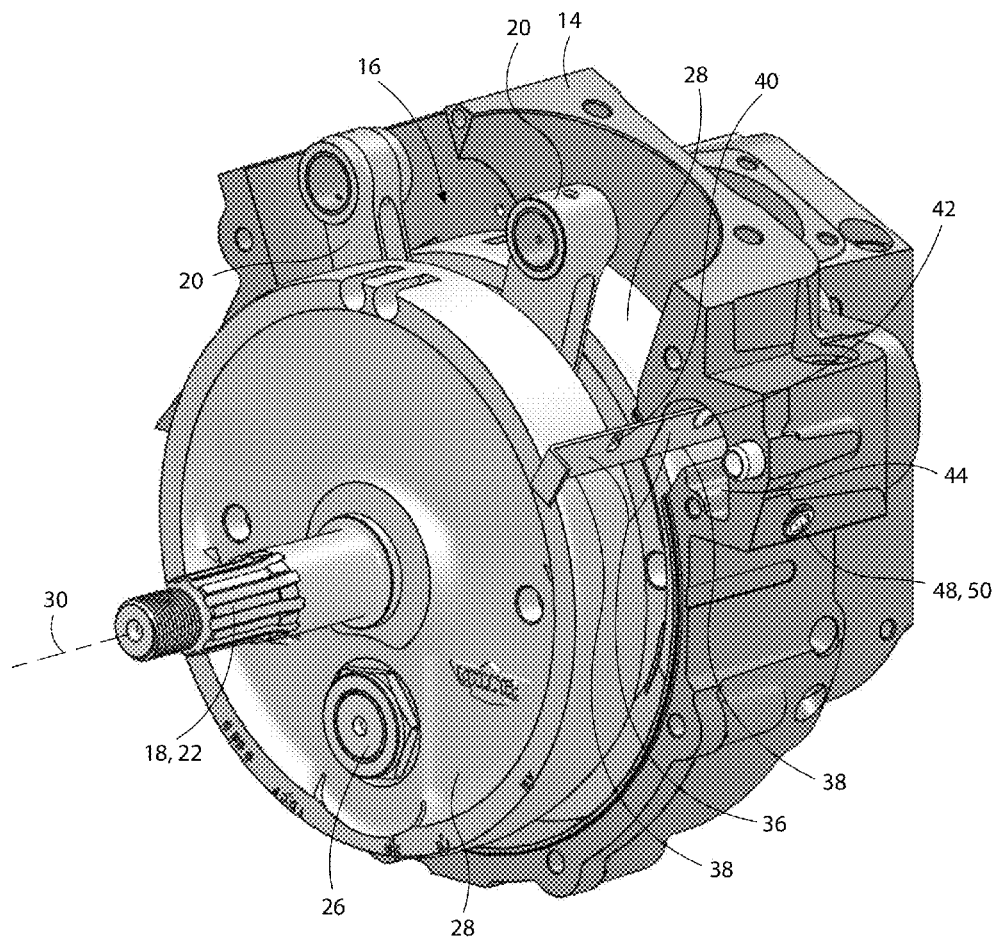
FIG. 2 depicts a perspective of the engine portion shown in FIG. 1 with half of the engine case (except the oil scraper of that half) removed for purposes of describing the invention.
Figure 3:
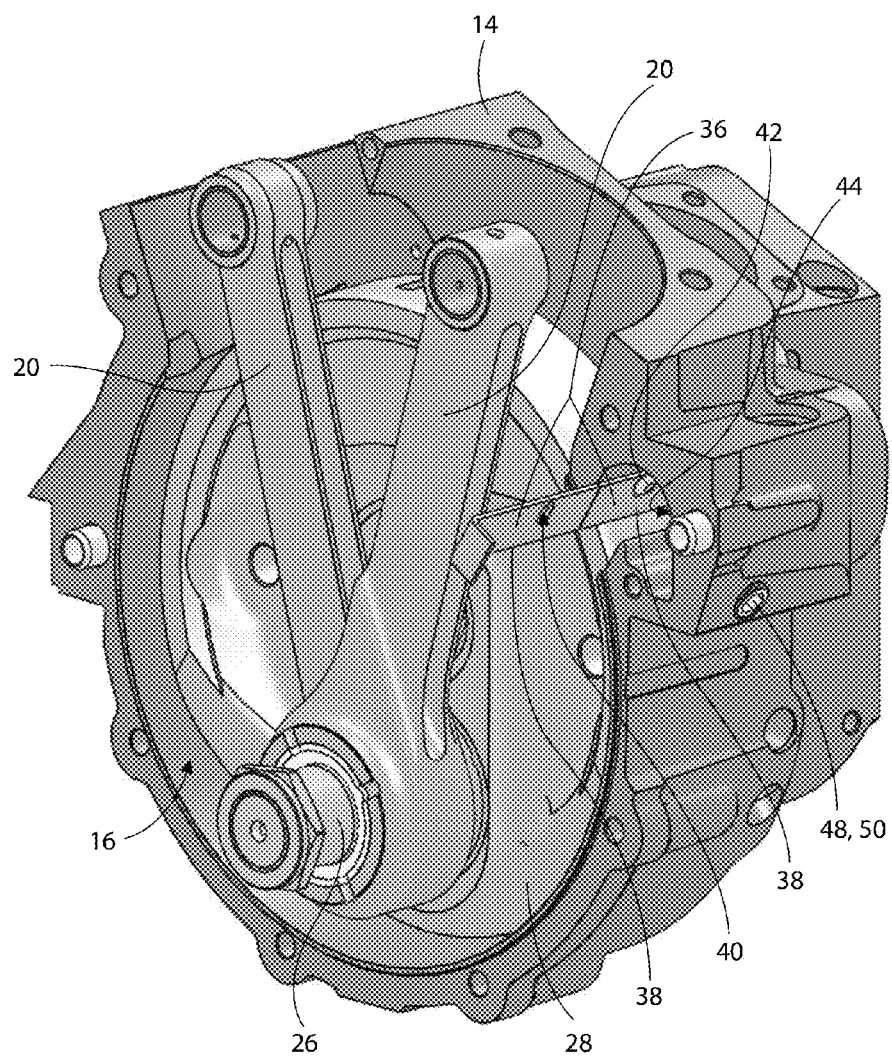
FIG. 3 depicts a perspective of the engine portion shown in FIG. 2 with one of the flywheels also removed.

As mentioned above, the first half 12 and the second half 14 of the engine case 10 collectively form an internal cavity 16 when the halves are joined to each other. The first half 14 of the engine case 10 comprises a crankshaft opening 32 though which the sprocket shaft 22 extends. A bearing (not shown) rotationally connects the sprocket shaft 22 to the first half 12 of engine case 10. The first half 14 of the engine case 10 also comprises an adjustable oil scraper 36. In use, the oil scraper 36 is fixed in position relative to the remainder of the first half 12 of the engine case 10. However, the oil scraper 36 comprises a scraping edge 38 that can be selectively and adjustably moved toward or away from the crankshaft axis 30. As most clearly seen by comparing FIGS. 4 and 5, the oil scraper 36 is selectively movable along a linear path that lies in a plane that is parallel to, and offset from, the crankshaft axis 30. However, it should be appreciated that it is not essential for the plane to be offset from the crankshaft axis 30 nor is it essential for the path to be linear. As shown most clearly in FIGS. 2 and 3, the oil scraper 26 comprises an oval opening 40. A threaded fastener (not shown, but similar to the threaded fastener 42 show in FIG. 3 securing the oil scraper 36 of the second half 14 of the engine case 10) passes through the oval opening 40 and secures the oil scraper 36 to the remainder of the first half 12 of the engine case 10. By loosening the treaded fastener 42, the scraping edge 38 of oil scraper 36 can be moved toward or away from the crankshaft axis 30. Tightening the threaded fastener 42 locks the oil scraper 36 in position relative to the remainder of the first half 12 of the engine case 10. The elongate nature of the oval opening 40 allows for the positional adjustments. The first half 12 of the engine case 10 further comprises an oil accumulation recess adjacent the oil scraper 36.

The second half 14 of the engine case 10 is similar to the first half 12 and also comprises an oil scraper 36 that is attached to the remainder of the second half 14 via a threaded fastener 42. The second half 14 of the engine case 10 comprises a crankshaft opening 43 though which the pinion shaft 24 extends. Like with the first half 12 of the engine case 10, the position of the oil scraper 36 of the second half 14 can be adjusted. The second half 14 of the engine case 10 further comprises an oil accumulation recess 44 adjacent the oil scraper 36. The oil accumulation recess 44 is operatively connected to the oil pump cavity 46, which is located on the rear of the second half 14 of the engine case 10 (see FIG. 6).

Figure 4:
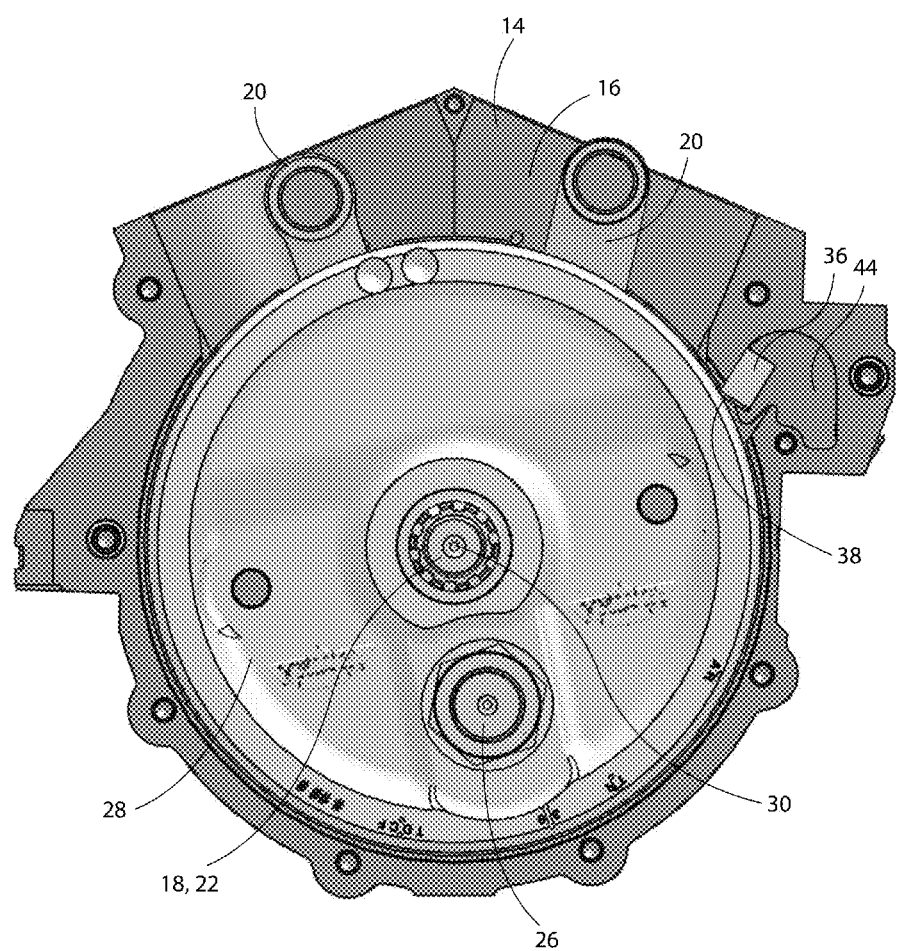
FIG. 4 depicts a view of the engine portion shown in FIG. 2 as viewed straight down the crankshaft axis.
Figure 5:
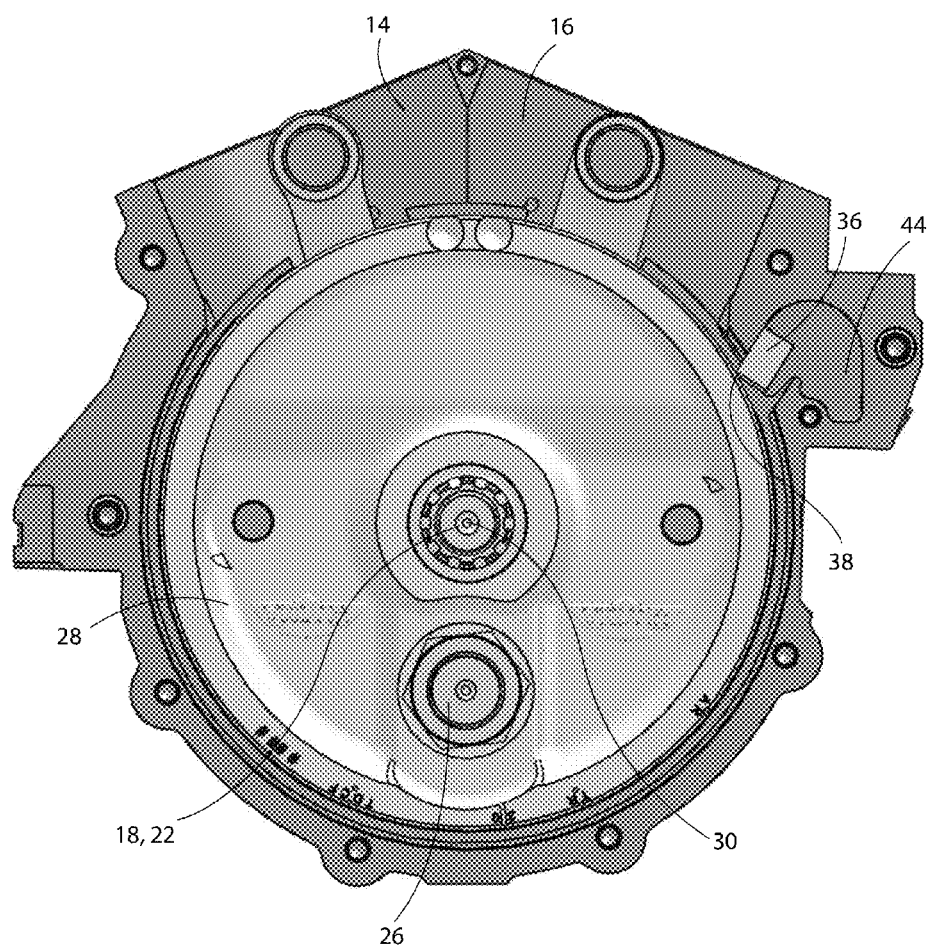
FIG. 5 depicts a view of the engine portion as shown in FIG. 4, but with the flywheels replaced with slightly smaller flywheels.

In use, the oil scrapers 36 of the first and second halves 12, 14 of the engine case 10 are positioned such that their scraping edges 38 are only slightly spaced from their respective flywheels 28. As such, when the flywheels 28 rotate, excess oil clinging to the flywheels is scraped off of the flywheels by the oil scrapers 36. The removed oil is then channeled to the oil pump cavity 46 via the oil accumulation recess 44. If desired, the first half 12 and the second half 14 of the engine case 10 can be separated from each other to allow someone to swap-out the flywheels 28 with other flywheels of a different dimension. For example, the flywheels 28 shown in FIG. 4 are each a standard 8.5 inch diameter flywheel, whereas the flywheels 28' shown in FIG. 5 are slightly smaller 8.25 inch diameter flywheels. To accommodate the difference using the same engine case halves, the threaded fasteners 42 securing the oil scrapers 36 in position are loosened and then the oil scrapers are adjusted in a manner such that the oil scrapers are approximately an eighth on an inch closer to the crankshaft axis 30. After repositioning the oil scrapers 36, the threaded fasteners 42 are retightened to lock the oil scrapers in position. To facilitate the loosening and tightening of the threaded fasteners 42, the first and second halves 12, 14 of the engine case 10 are provided with access ports 48 that allow adjustment of the fasteners via a standard screwdriver. Threaded plugs 50 block the access ports 48 when not in use.

In view of the foregoing, it should be appreciated that the invention achieves the several advantages over prior art engine cases.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A motorcycle engine case comprising:
   crankshaft support portions configured and adapted to support a crankshaft in a manner such that the crankshaft is rotatable about a crankshaft axis relative to the engine case;
   an internal cavity configured and adapted to house at least one flywheel in a manner such that the flywheel is rotatable about the crankshaft axis with the crankshaft relative to the engine case; and
   an adjustable oil scraper that is movable toward and away from the crankshaft axis and that can be locked in position relative to the crankshaft axis, the oil scraper being adapted and configured to remove oil clinging to the flywheel as the flywheel rotates about the crankshaft axis.

2. A motorcycle engine case in accordance with claim 1 wherein the oil scraper constitutes a first oil scraper and the motorcycle engine case comprises a second adjustable oil scraper that is movable independently of the first oil scraper toward and away from the crankshaft axis and that can be locked in position relative to the crankshaft axis.

3. A motorcycle engine case in accordance with claim 1 wherein the oil scraper is movable toward and away from the crankshaft axis along a linear path and the linear path lies in a plane that is parallel to and offset from the crankshaft axis.

4. A motorcycle engine case comprising:
- crankshaft support portions configured and adapted to support a crankshaft in a manner such that the crankshaft is rotatable about a crankshaft axis relative to the engine case;
- an internal cavity configured and adapted to house at least one flywheel in a manner such that the flywheel is rotatable about the crankshaft axis with the crankshaft relative to the engine case;
- an adjustable oil scraper that is movable toward and away from the crankshaft axis and that can be locked in position relative to the crankshaft axis, the oil scraper being adapted and configured to remove oil clinging to the flywheel as the flywheel rotates about the crankshaft axis, the oil scraper comprising an elongate slot; and
- a threaded fastener extending through the elongate slot, the threaded fastener securing and locking the oil scraper in position relative to the crankshaft axis.

5. A motorcycle engine case in accordance with claim 4 wherein the oil scraper is movable toward and away from the crankshaft axis along a linear path and the linear path lies in a plane that is parallel to and offset from the crankshaft axis.

6. A motorcycle engine case in accordance with claim 5 wherein the oil scraper constitutes a first oil scraper and the motorcycle engine case comprises a second adjustable oil scraper that is movable independently of the first oil scraper toward and away from the crankshaft axis and that can be locked in position relative to the crankshaft axis.

7. A motorcycle engine case comprising:
- crankshaft support portions configured and adapted to support a crankshaft in a manner such that the crankshaft is rotatable about a crankshaft axis relative to the engine case;
- an internal cavity configured and adapted to house at least one flywheel in a manner such that the flywheel is rotatable about the crankshaft axis with the crankshaft relative to the engine case;
- a first adjustable oil scraper that is movable toward and away from the crankshaft axis and that can be locked in position relative to the crankshaft axis, the oil scraper being adapted and configured to remove oil clinging to the flywheel as the flywheel rotates about the crankshaft axis;
- a second adjustable oil scraper that is movable independently of the first oil scraper toward and away from the crankshaft axis and that can be locked in position relative to the crankshaft axis; and
- first and second halves that are removably secured to each other, the first and second halves collectively defining the internal cavity, the first half comprising the first oil scraper, the second half comprising the second oil scraper.

8. A method comprising:
- removing a first flywheel from a motorcycle engine case, the engine case comprising an adjustable oil scraper configured and adapted to remove oil clinging to the first flywheel as the first flywheel rotates about a crankshaft axis, the first flywheel having a largest cross-sectional dimension;
- installing a second flywheel in the motorcycle engine case, the second flywheel having a largest cross-sectional dimension; the largest cross-sectional dimension of the first flywheel being different from the largest cross-sectional dimension of the second flywheel;
- adjusting the position of the oil scraper relative to the crankshaft axis in a manner accounting for the difference between the largest cross-sectional dimension of the first flywheel and the largest cross-sectional dimension of the second flywheel.

9. A method comprising:
- removing a first flywheel from a motorcycle engine case, the engine case comprising an adjustable oil scraper configured and adapted to remove oil clinging to the first flywheel as the first flywheel rotates about a crankshaft axis, the first flywheel having a largest cross-sectional dimension;
- installing a second flywheel in the motorcycle engine case, the second flywheel having a largest cross-sectional dimension; the largest cross-sectional dimension of the first flywheel being different from the largest cross-sectional dimension of the second flywheel;
- adjusting the position of the oil scraper relative to the crankshaft axis in a manner accounting for the difference between the largest cross-sectional dimension of the first flywheel and the largest cross-sectional dimension of the second flywheel;
- unlocking the oil scraper from a locked position relative to the crankshaft axis before the step of adjusting the position of the oil scraper relative to the crankshaft axis; and
- locking the oil scraper in position relative to the crankshaft axis after the step of adjusting the position of the oil scraper relative to the crankshaft axis.

10. A method in accordance with claim 9 wherein the unlocking and the locking of the oil scraper is performed by turning a treaded fastener.

11. A method comprising:
- removing a first flywheel from a motorcycle engine case, the engine case comprising an adjustable oil scraper configured and adapted to remove oil clinging to the first flywheel as the first flywheel rotates about a crankshaft axis, the first flywheel having a largest cross-sectional dimension;
- installing a second flywheel in the motorcycle engine case, the second flywheel having a largest cross-sectional dimension; the largest cross-sectional dimension of the first flywheel being greater than the largest cross-sectional dimension of the second flywheel;
- adjusting the position of the oil scraper relative to the crankshaft axis in a manner accounting for the difference between the largest cross-sectional dimension of the first flywheel and the largest cross-sectional dimension of the second flywheel by moving the oil scraper toward the crankshaft axis along a linear path, the linear path lying in a plane that is parallel to and offset from the crankshaft axis.

12. A method comprising:
- removing a first flywheel from a motorcycle engine case, the engine case comprising an adjustable oil scraper configured and adapted to remove oil clinging to the first flywheel as the first flywheel rotates about a crankshaft axis, the first flywheel having a largest cross-sectional dimension;
- installing a second flywheel in the motorcycle engine case, the second flywheel having a largest cross-sectional dimension; the largest cross-sectional dimension of the first flywheel being different from the largest cross-sectional dimension of the second flywheel;
- adjusting the position of the oil scraper relative to the crankshaft axis in a manner accounting for the difference between the largest cross-sectional dimension of the first flywheel and the largest cross-sectional dimension of the second flywheel removing a third flywheel from the motorcycle engine case, the engine case comprising an adjustable second oil scraper configured and adapted to remove oil clinging to the third flywheel as the third flywheel rotates about the crankshaft axis, the third flywheel having a largest cross-sectional dimension;

installing a fourth flywheel in the motorcycle engine case, the fourth flywheel having a largest cross-sectional dimension; the largest cross-sectional dimension of the third flywheel being different from the largest cross-sectional dimension of the fourth flywheel; and adjusting the position of the second oil scraper relative to the crankshaft axis in a manner accounting for the difference between the largest cross-sectional dimension of the third flywheel and the largest cross-sectional dimension of the fourth flywheel.

* * * * *